No. 789,380. PATENTED MAY 9, 1905.
J. PFEIFFER, Jr.
AUTOMATIC SAFETY DEVICE FOR GAS CONNECTIONS.
APPLICATION FILED APR. 27, 1903. RENEWED OCT. 15, 1904.
2 SHEETS—SHEET 1.
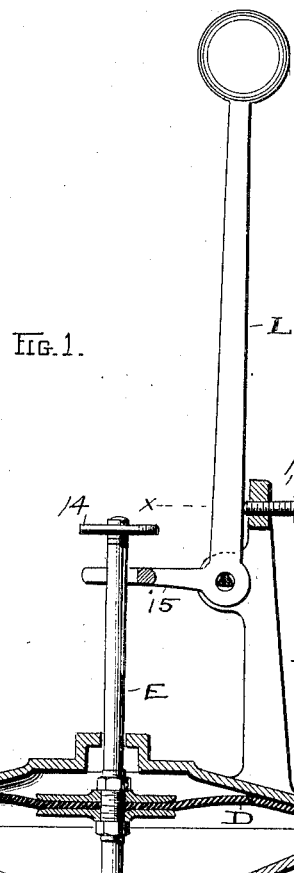
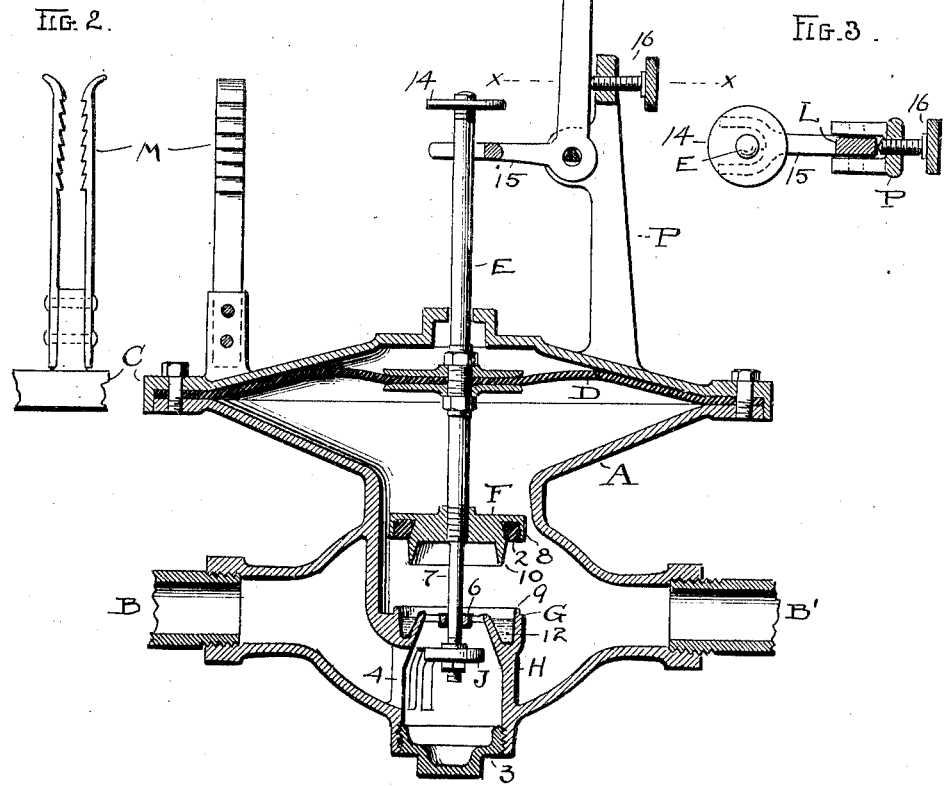
ATTEST.
INVENTOR.
Jacob Pfeiffer Jr
BY
H. J. Fisher
ATTY No. 789,380. PATENTED MAY 9, 1905.
J. PFEIFFER, Jr.
AUTOMATIC SAFETY DEVICE FOR GAS CONNECTIONS.
APPLICATION FILED APR. 27, 1903. RENEWED OCT. 15, 1904.

2 SHEETS—SHEET 2.

ATTEST.

INVENTOR.
Jacob Pfeiffer Jr
BY
H. T. Fisher ATTY

No. 789,380.

Patented May 9, 1905.

UNITED STATES PATENT OFFICE.

JACOB PFEIFFER, JR., OF AKRON, OHIO.

AUTOMATIC SAFETY DEVICE FOR GAS CONNECTIONS.

SPECIFICATION forming part of Letters Patent No. 789,380, dated May 9, 1905.

Application filed April 27, 1903. Renewed October 15, 1904. Serial No. 228,645.

*To all whom it may concern:*

Be it known that I, JACOB PFEIFFER, Jr., a citizen of the United States, residing at Akron, in the county of Summit and State of Ohio, have invented certain new and useful Improvements in Automatic Safety Devices for Gas Connections; and I do declare that the following is a full, clear, and exact description of the invention, which will enable others skilled in the art to which it appertains to make and use the same.

My invention relates to an automatic safety device for gas connections substantially as shown and described, and particularly pointed out in the claims.

Figure 4:
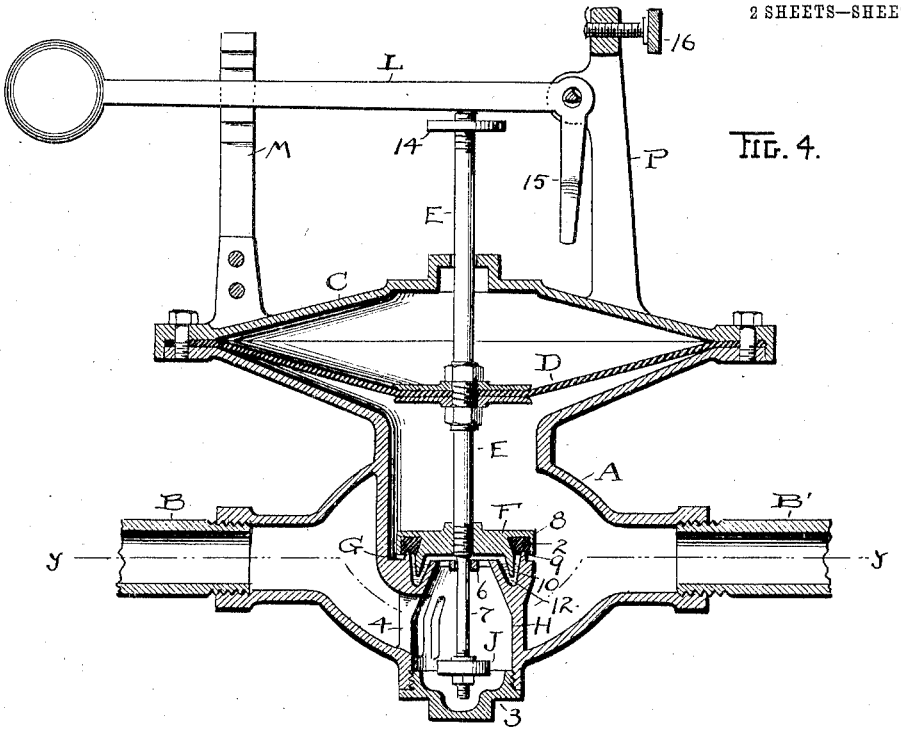
Figure 5:
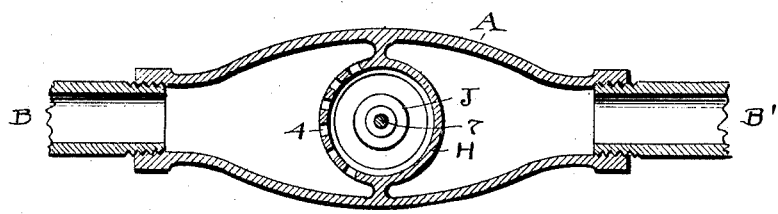

In the accompanying drawings, Figure 1 is a central vertical sectional elevation of my improved device with the counterweight up and the gas-passage open, and Fig. 2 is an elevation of the spring-ratchets for engaging the counterweight when down. Fig. 3 is a cross-section on line $x\,x$, Fig. 1. Fig. 4 is a sectional elevation of the invention corresponding in detail to Fig. 1, but with the operating parts down to close off the flow of gas. Fig. 5 is a plan view on line $y\,y$, Fig. 4.

The idea of this invention is to provide a reliable precautionary device for use more especially in natural-gas connections to the end that when for any reason the flow of gas drops below a certain pressure or ceases entirely the gas channel or passage will be promptly and automatically closed and remain closed until personally opened again.

It is well known to persons familiar with natural gas, especially to those living in cities located more or less remotely from the source of supply, that the flow of gas is at its best uncertain and that it is liable at almost any time to fall below a flame-sustaining pressure or to subdue entirely and that its return is equally uncertain and often spasmodic. Hence the common danger in using natural gas without safety devices, and particularly since it is practically odorless and cannot be detected by the senses as manufactured gas can be. My invention is designed to anticipate all these conditions and is constructed in such a way that it responds to every known danger and avoids possible harm or accident by cutting off the gas when the danger-point is reached, as also will clearly appear in the further description thereof.

In the drawings, A represents a combined coupling and casing between the gas-supply pipe B and B', and the said coupling and casing may be placed in any available position or where the pipe connections are or may be made horizontal, so as to operate as planned for herein. If the parts were set into a vertical position pipe connection, the means for cutting off the gas-supply would require some modification. The said coupling and casing is preferably cast in one piece; but it might be made in two pieces, and the casing referred to is comprised in the lower portion of the diaphragm-chamber, of which C is the removable or upper section or cover. Between these two parts I fix the edge of diaphragm D, which is essentially a piston and might be substituted by a different form of piston and be within the invention. However, I much prefer a diaphragm-piston for sundry reasons, among which is its large surface, and hence its adaptability to work with natural gas under the conditions that usually attend its service.

E is a valve-rod extending through piston D and carrying valve F at it lower end, while its upper end projects loosely out through cover C into position to be engaged by weighted lever L. Said valve F is adapted to rest down upon the seat G within coupling A, and said seat is at the top of barrel or well H integral with said coupling and closed at its bottom by removable threaded cap 3. This barrel is open on the gas-inlet side by or through a series of vertical slots 4 or their equivalent and is otherwise closed about its side, but open at its top, and a spider 6 at said top has a central opening through which a reduced lower portion or extension 7 on valve-rod E projects and carries a gas regulating or controlling disk J.

Valve F for greater safety has two seats in or upon the seat G, and to this end it is provided with a rubber or like flexible ring 2, inserted in its upper overhanging portion 8, which engages a rather sharply-defined rim 9 on said valve-seat, and on the lower portion of the valve there is an annular downwardly-extending flange 10, forming something like a cup shape and adapted to enter a corresponding annular channel or trough 12 in the part G. This channel is preferably filled with quicksilver to make an effective liquid seal, and both seats of the valve are closed at the same time.

Disk J on stem 7 is intended to operate as a check against an undue rush of gas into pipe B', whereby I avoid the blowing of the gas at the jet and moderate and equalize the flow. This part J, whether of disk shape or some other shape, may more or less fully occupy the well H about its edge or side, according to the volume of gas it may be necessary to provide for when a maximum quantity is used, and it moves up and down with valve F, as shown.

Normally and always in the absence of danger from irregularity in the flow of gas the piston or diaphragm D is up and valve F is open. It is not intended that this position of the parts shall be interfered with from the outside, and the said parts will remain open until gas-pressure within drops to the danger-point, when they will automatically close by the gravity of valve F, rod E, and other parts connected therewith. As this occurs disk 14 on the top of piston-rod E engages projection 15 of weighted arm L and turns said arm off its poise or pivot, as in Fig. 1, so that it will drop into position, Fig. 4, and in dropping fall onto the end of valve-rod E and serve as a counterweight to keep the valve F on its seat. Spring ratchet-catches M have teeth on their inside which engage arm L and hold it down, and in this way the effective closure of valve F is assured. A set-screw 16 serves to fix the poise of arm L and make it as sensitive as may be needed. Ordinarily it stands erect, as in Fig. 1. A post P on cover C is shown here as supporting lever L. When weighted-arm lever L is raised and pressure of gas is reëstablished, the gas raises valve F and flows in under diaphragm D, thus bringing all said parts to open working position again and holding them there, as in Fig. 1. When the check device J is up, as in Fig. 1, it not only limits the inflow of gas so as to prevent a blowing noise at the jet, but it protects the burner-mantles from being ruptured and destroyed. This latter danger is especially common with natural gas when it has no restrictions back of the jet-valve. It will also be noticed that the sides of the upper portion of the well containing check-disk J taper somewhat upwardly, so that if only one light be used the pressure under the diaphragm would hold it up and allow only a minimum quantity of gas to flow in. Then as lights are added and the pressure inside is diminished the diaphragm will drop proportionately and disk J will drop and allow more gas to enter. These balances are automatically maintained, regardless of the number of lights used, as long as the drain is not greater than the supply.

What I claim is—

1. The coupling having a double valve-seat and a well beneath said seat provided with a gas-inlet in its side, a valve-rod and a valve having seating portions 2 and 10 on different horizontal planes adapted to said double seat, in combination with a diaphragm fixed on said valve-rod and a pivoted counterweighted lever in operative engagement with said piston-rod, substantially as described.

2. The coupling having a horizontal valve-seat and a well beneath said seat and provided with an inlet-opening in its side and a closed bottom, in combination with a combined valve and diaphragm rod and a valve and a diaphragm thereon in different planes, said valve adapted to rest down upon said valve-seat, and a disk-shaped check device supported on the said rod beneath the said valve in said well and smaller in cross-section than the inside of the well, and a casing for the said diaphragm open at its bottom to said valve and seat, and a counterweighted lever in operative engagement with the upper end of said combined valve and diaphragm rod, substantially as described.

Witness my hand to the foregoing specification this 28th day of March, 1903.

JACOB PFEIFFER, JR.

Witnesses:
R. B. MOSER,
R. ZBORNIK.